United States Patent [19]

Sabourin et al.

[11] Patent Number: 6,073,099
[45] Date of Patent: Jun. 6, 2000

[54] PREDICTING AUDITORY CONFUSIONS USING A WEIGHTED LEVINSTEIN DISTANCE

[75] Inventors: Michael Sabourin, St. Lambert; Marc Fabiani, Octrement, both of Canada

[73] Assignee: Nortel Networks Corporation, Canada

[21] Appl. No.: 08/964,023

[22] Filed: Nov. 4, 1997

[51] Int. Cl.[7] .................................................. G10L 5/04
[52] U.S. Cl. .............................. 704/256; 704/254
[58] Field of Search ................................ 704/254, 2, 4, 704/277, 231, 238, 200, 242, 241, 256, 255

[56] References Cited

U.S. PATENT DOCUMENTS

| | | | |
|---|---|---|---|
| 4,813,076 | 3/1989 | Miller | 395/2.63 |
| 5,163,111 | 11/1992 | Baji et al. | 395/22 |
| 5,426,745 | 6/1995 | Baji et al. | 345/469 |
| 5,555,344 | 9/1996 | Zunkler | 704/242 |
| 5,664,058 | 9/1997 | Vysotsky | 704/243 |
| 5,799,276 | 8/1998 | Komissarchik et al. | 704/251 |
| 5,806,038 | 9/1998 | Huang et al. | 704/268 |
| 5,809,462 | 9/1998 | Nussbaum | 704/232 |

OTHER PUBLICATIONS

Peter Stubley et al., "State Clustering of HMMs with Continuous Mixture Densities," Bell–Northern Research, 2 pgs. No Date.

*Primary Examiner*—Richemond Dorvil
*Attorney, Agent, or Firm*—Finnegan, Henderson, Farabow, Garrett & Dunner, L.L.P.

[57] ABSTRACT

A confusability tool generates a confusability cost associated with two phonemic transcriptions. The confusability cost measures the likelihood that a human or machine hearing the first word will mistakenly hear the second word. The cost calculation is based on a weighting of the Levinstein distance between the transcription pair.

22 Claims, 3 Drawing Sheets

PREDICTING AUDITORY CONFUSIONS USING A WEIGHTED LEVINSTEIN DISTANCE

BACKGROUND OF THE INVENTION

The present invention relates generally to speech processing and recognition, and specifically, to methods and systems of predicting the likelihood of a human or machine confusing two different words or phrases.

Words that sound alike tend to be confused with one another. For example, a listener hearing the word "brush" may mistakingly believe she is hearing "rush," while the same listener hearing the word "falcon" is not likely to believe that she is hearing the word "peckham."

Knowing that two words are likely to be confused can be useful in a number of applications. For example, two applications that may benefit from knowing the likelihood of confusion of two words are: speech recognition algorithms, which attempt to associate a spoken word with its intended orthography (i.e., the English written version of the word), and vocabulary rejection algorithms, which determine whether a spoken word is present in a predefined dictionary.

One method to determine the likelihood of confusion between spoken words is to simply have a human expert rate the potential confusability of the words based on intuition and experience. However, this method is laborious and results in subjective and inconsistent confusability measurements.

Thus, there is a need to be able to automatically generate, from a written version of a word, an objective metric of the likelihood of confusing a spoken word with another spoken word.

SUMMARY OF THE INVENTION

It is an object of the present invention to automatically generate an objective metric of the likelihood of confusing two words.

A method consistent with the present invention determines the likelihood of confusing a first word for a second word. The method comprises the steps of (1) phonemically transcribing the first and second words into first and second transcriptions; (2) calculating a Levinstein distance between the first and second transcriptions as the number of edit operations required to transform the first transcription into the second transcription; (3) obtaining a phonemic transformation weight for each edit operation of the Levinstein distance; and (4) summing the weights to generate a value indicating the likelihood of confusion between the first and second words.

Additionally, a computer system consistent with the present invention comprises a memory, a processor, and a display. The memory stores a confusability tool program and a transcripted phonemic lexicon. The confusability tool program includes means for calculating a Levinstein distance between first and second phonemic transcriptions from the lexicon as the number of edit operations required to transform the first transcription into the second transcription, obtaining a phonemic transformation weight for each edit operation of the Levinstein distance, and summing the weights to generate a value indicating the likelihood of confusion between the first and second transcriptions.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to the embodiments of the invention, examples of which are illustrated in the accompanying drawings.

Generally, methods and systems consistent with the present invention generate, for each of multiple pairs of phonemic transcriptions, a numeric indication of the potential confusability of the spoken version of the phonemic transcriptions. The numeric indication is based on the Levinstein distance, which determines the number of edit operations required to transform a first phonemic transcription into a second. The number of edit operations can be roughly equated to the degree of similarity, or the confusability, of the two phonemic transcriptions. The final numeric indication of confusability is derived from the Levinstein distance by multiplying each required edit operation by a weight corresponding to the significance of the edit operation, and summing the resultant values.

A "phonemic transcription" of a word is a representation of the word comprising a series of phonemes, which are the basic units of sound in a given language that distinguish one word from another. For example, the initial sound in "cat" and "kick" may be represented by the phonemic symbol /k/ while the one in "circus" may be represented by the symbol /s/. Throughout this disclosure, a phonemic alphabet of 40 symbols is used, although other phonemic alphabets could equivalently be used. Further, backslashes will be used to distinguish a symbol as a phonemic one. In contrast to a phonemic transcription of a word, an orthographic transcription of the word refers to the typical spelling of the word.

Phonemic transcriptions are important because English spelling is not phonetic; that is, there is often no direct correspondence between the spelling and the sounds we actually produce. One sound can be represented by a number of different letters or combinations of letters. For example, the first sound in the words "cat," "kick," "quick," and "chemistry" is the same.

Figure 1:
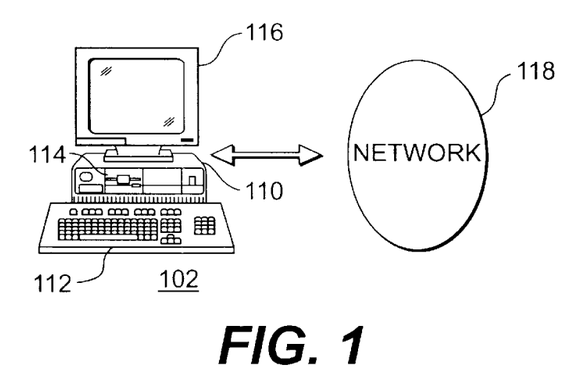
FIG. 1 is a block diagram of an exemplary computer system used to execute methods consistent with the present invention.

FIG. 1 is a block diagram of an exemplary computer system used to execute methods consistent with the present invention. Computer system 102 includes a chassis 110, which holds the computer's main processor and main memory; an input device such as keyboard 112; a storage device such as floppy or hard disk drive 114; and a display such as monitor 116. Preferably, the methods described herein are executed by the processing section of computer system 102. Computer system 102 is shown connected to network 118, and may be operated directly by a user or through the network.

Many variations of computer system 102 are possible. For example: storage device 114 may additionally include storage media such as optical disks, and user input device 112, instead of or in addition to keyboard 112, may include any type of user input device such as: an electronic mouse, a trackball, a lightpen, a touch-sensitive pad, a digitizing tablet, or a joystick.

Figure 2:
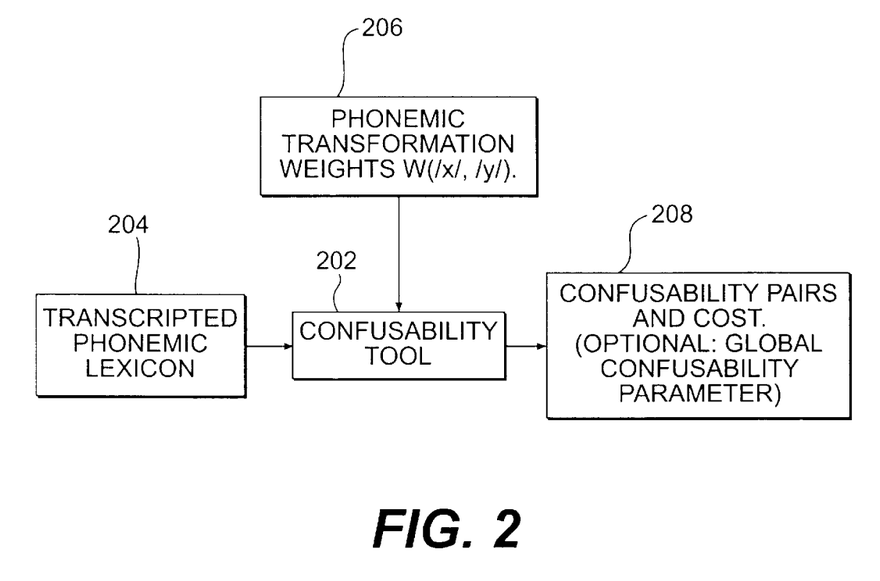
FIG. 2 is high level block diagram illustrating the functional relationships of software components consistent with the present invention.

FIG. 2 is high level block diagram illustrating a functional relationship of the data operated on by computer system 102. As shown, a confusability tool 202 receives, as inputs, a phonemically transcribed lexicon 204 and a phonemic transformation weight matrix 206. Lexicon 204 may be, for example, a pre-selected corpus of orthographies that have been phonemically transcribed either manually or through a known automated transcription method. The phonemic transformation weight matrix 206, W(/x/, /y/), specifies a weight value for each pair of phoneme symbols (/x/, /y/), as well as the phoneme null pairs (/x/,' ') and (' ',/y/).

Based on phonemic lexicon 204 and weight matrix 206, confusability tool 202 generates an ordered set of predicted auditory confusions 208. The generated output set is preferably in the form {orthography 1, orthography 2, cost}, where the cost is a number between zero and one. A small value of cost indicates a high level of potential confusability and a large value of cost indicates a high level of distinctiveness.

In addition to the ordered set of predicted auditory confusions, the tool may output a global confusability parameter. This parameter measures the confusability of the entire input lexicon and is preferably generated by inverting the confusability cost for the most confusable pairs of orthographies and summing the inverted values.

Figure 3:
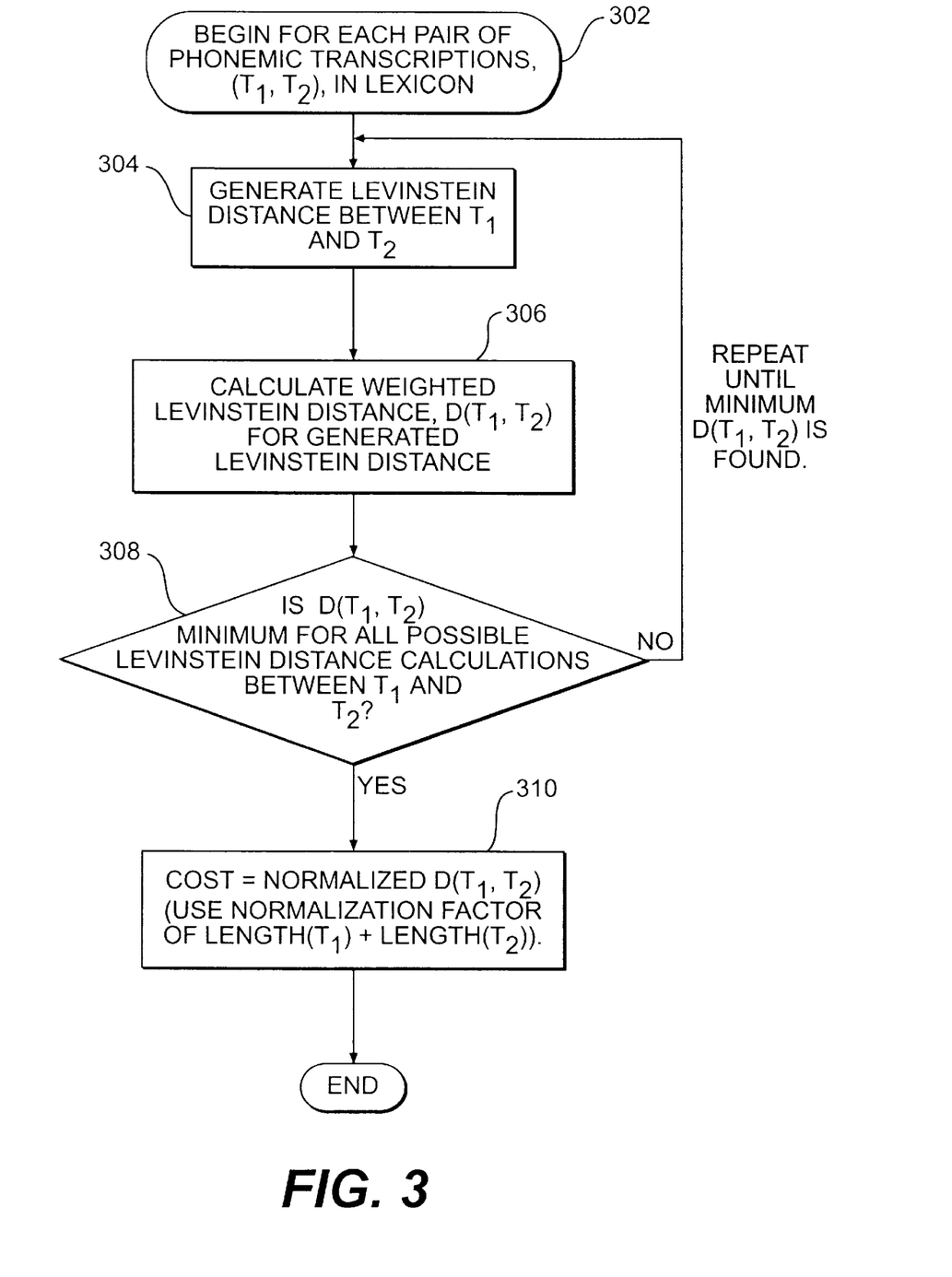
FIG. 3 is a flowchart illustrating a method of confusability cost calculation for phonemic transcription pairs.

FIG. 3 is a flowchart illustrating the operation of the confusability tool 202 for phonemic transcription pairs from lexicon 204. For each pair of phonemic transcriptions $T_1$ and $T_2$, the tool calculates a Levinstein distance and the edits needed to transform $T_1$ into $T_2$ (described in more detail below) and uses this information to calculate a weighted Levinstein distance (steps 302, 304, and 306). A weighted Levinstein distance is calculated for each possible Levinstein distance, and the final weighted Levinstein distance, $D(T_1, T_2)$, is defined as the minimum of the possible weighted Levinstein distances (step 308). The final cost value is a normalized version of $D(T_1, T_2)$ (step 310). The normalization is preferably performed by dividing the final weighted Levinstein distance by the length of $T_1$ plus $T_2$.

The final weighted Levinstein distance, determined in step 308, can be represented in a single equation as:

$$D(T_1, T_2) = \min \sum_{i=1}^{N} W_i(/x/, /y/) \quad (1)$$

Here, $T_1$ is the source phonemic transcription, $T_2$ is the target phonemic transcription, N is the number of transformations between $T_1$ and $T_2$, i is the index representing the edit operations of the Levinstein distance set (i.e., the particular substitutions, deletions, or insertions), and /x/ and /y/ are the phonemes involved in the edit, and may be the null phoneme ' ' for an insertion or deletion. The function W is the phonemic transformation weight 206 associated with the phonemic pair (/x/, /y/). As described above with reference to step 308, the minimization indicated by "min" is over the possible phonemic transformations between $T_1$ and $T_2$.

Some orthographies have more than one phonemic transcription. To calculate the minimum weighted Levinstein distance between a pair of orthographies having different transcriptions, steps 302, 304, 306, and 308 are repeated for each possible pairing of the phonemic transcriptions of the two orthographies. If the weighted Levinstein distance between a pair of orthographies is denoted $D(O_1, O_2)$, where $O_1$ and $O_2$ are the two distinct orthographies, then, in terms of equation (1), $D(O_1, O_2)$ can be written as:

$$\min D(T_1(i), T_2(j)) i=[1 \ldots n]; j=[1 \ldots m] \quad (2)$$

Here, the weighted Levinstein distance between the pair of orthographies is defined as the minimum weighted Levinstein distance between the n possible transcriptions of $T_1$ and m possible transcriptions of $T_2$.

Calculation of Levinstein Distance

As discussed above, calculation of the weighted Levinstein distance requires calculation of the Levinstein distance between two phonemic transcriptions (step 304). Suitable methods are known for computing the Levinstein distance between two strings, and include, for example, a method using maximum substring matching and a method using the Viterbi search algorithm across a transcription graph. For purposes of explanation, an exemplary Levinstein distance calculation will now be described.

Calculating the Levinstein distance involves "editing" a first string to transform it into a second string. Three different types of edits are preferably used to perform the transformation: (1) substitution, (2) deletion, and (3) insertion. With these three edit operations, any word can be transformed into another. For example, the substitution transformation {'W', 'f'} may indicate that "wish" should be transformed into "fish"; the deletion transformation {'t', ' '} may indicate that "tent" is to become "ten"; and the insertion transformation {' ', 'h'} may indicate that "tent" is to become "tenth." Each substitution, deletion, or insertion is defined to involve only a single character symbol.

The Levinstein distance is the number of substitutions, deletions, or insertions required to transform the first phonemic transcription, $T_1$, into the second, $T_2$. Multiple transformation sets may be possible between $T_1$ and $T_2$. For example, "fishing" to "fashion" can be transformed as: (1) {'i', 'a'}, {' ', 'o'}, and {'g', ' '}; or as (2) {'i', 'a'}, {'n', 'o'}, and {'g', 'n'}. In this example, each transformation has a Levinstein distance of three. Note, however, that because W(' ', 'o') may have a value different than W('n', 'o'), the weighted Levinstein distance of (1) and (2) may vary. Accordingly, between (1) and (2), the chosen weighted Levinstein distance will be the smaller of the two.

Computation of Phonemic Transformation Weights $W_i(x, y)$

Consistent with the present invention, either one of two methods is used to calculate the phonemic transformation weights. Preferably these weights are precalculated and stored in a phonemic transformation weight matrix. In the case of a forty symbol phonemic alphabet (plus a null phoneme), a 41×41 phonemic transformation weight matrix would result.

Computation of Phonemic Transformation Weights Based on Phonological Features

A first method usable with the present invention for calculating the phonemic transformation weight for a phoneme pair (/x/, /y/) is based on descriptive values assigned by an expert to each phoneme. The phonemic transformation weights are given by:

$$W(/x/, /y/) = \sum_{i=1}^{N} \alpha_i t(f_i(/x/), f_i(/y/)) \quad (3)$$

where N is the number of phonological feature types and $\alpha_i$ is the relative significance of the feature type i. The functions $f_i(/x/)$ and $f_i(/y/)$ are the feature values of feature type i for phonemes /x/ and /y/, and $t(f(/x/), f(/y/))$ is the transformation penalty between feature values $f_i(/x/)$ and $f_i(/y/)$. The meaning of feature values, feature types, and transformation cost will be further explained.

As mentioned previously, forty phonemes may be used to describe English language words. Each phoneme sound is described by seven feature types, each of which may take on a number of values. The feature types, along with their permissible values, are shown below in Table I.

TABLE I

Feature Types and Values

| Feature Type | Feature Values |
|---|---|
| voicing | voiced, unvoiced |
| place | bilabial, labio-dental, dental, alveolar, palatal, palato-alveolar, velar, labio-velar, labio-palatal, uvular, pharyngeal, glottal |
| manner | stop, fricative, nasal, approximant, vowel, lateral, trill, flap, click, ejective, implosive, affricate |
| realization | aspirated, unexploded, syllabic, murmured, long, velarized, labialized, palatalized, rhoticized, nasalized, pharyngealized, tense |
| frontness | front, center, back |
| height | high, semi-high, upper-middle, middle, low |
| roundness | rounded, unrounded |

The phoneme /a/, for example, as in the word "cat," is assigned the feature values: "low," "front," and "unrounded". These feature values correspond to the feature types "height," "frontness," and "roundness," respectively. The feature types "voicing," "place," "realization," and "manner" are not specifically defined for /a/, and accordingly, /a/ is said to have a null feature value for these feature types. Table II lists the preferred 40 phonemes for English, and their corresponding feature values.

TABLE II

| Phoneme | Feature values |
|---|---|
| A | low back unrounded |
| a | low front unrounded |
| aj | low front unrounded/semi-high front unrounded |
| aw | low front unrounded/semi-high back rounded |
| b | voiced bilabial stop |
| D | voiced dental fricative |
| d | voiced alveolar stop |
| dZ | voiced alveolar stop/voiced palato-alveolar fricative |
| E | middle front unrounded |
| e | upper-middle front unrounded |
| f | voiceless labio-dental fricative |
| g | voiced velar stop |
| g- | voiced velar nasal stop |
| h | voiceless glottal fricative |
| I | semi-high front unrounded |
| i | high front unrounded |
| j | voiced palatal approximant |
| k | voiceless velar stop |
| l | voiced alveolar lateral approximant |
| m | voiced bilabial nasal stop |
| n | voiced alveolar nasal stop |

TABLE II-continued

| Phoneme | Feature values |
|---|---|
| O | back middle rounded |
| Oj | back middle rounded/semi-high front unrounded |
| o | back upper-middle rounded |
| p | voiceless bilabial stop |
| r | voiced alveolar approximant |
| s | voiceless palato-alveolar fricative |
| s | voiceless alveolar fricative |
| T | voiceless dental fricative |
| t | voiceless alveolar stop |
| tS | voiceless alveolar stop/ voiceless palato-alveolar fricative |
| U | back semi-high rounded |
| u | back high rounded |
| v | voiced labio-dental fricative |
| W | voiceless labio-velar approximant |
| w | voiced labio-velar approximant |
| Z | voiced palato-alveolar fricative |
| z | voiced alveolar fricative |
| ^ | back middle unrounded |
| * | center unrounded |

Each feature type relates loosely to the physiological action used to make the phoneme sound. "Place" refers to the position of the primary articulator (e.g., tongue blade, tongue dorsum, lips), "manner" refers to the articulatory method used to generate the sound, "realization" refers to allophonic attributes of the production of the sound, "frontness" and "height" refer to tongue tip position in the production of the vowels, and "roundness" refers to the lip shape during production of the vowels.

The feature types are not all equally significant in the production of a sound. For example, the significance of "manner" is stronger than that of "rounding." The relative significance value, $\alpha_i$, is used to quantify the significance of the various feature types. The values of $\alpha_i$ were assigned by a speech expert and are shown in Table III.

TABLE III

| Feature Type | Numeric Significance, $\alpha_i$ |
|---|---|
| voicing | 0.3 |
| place | 0.7 |
| manner | 0.8 |
| realization | 0.25 |
| frontness | 0.4 |
| height | 0.6 |
| roundness | 0.2 |

In addition to the relative significance value, $\alpha_i$, transformation penalties are used to calculate the phonemic transformation weights. The transformation penalty is a function of two feature values of a feature type, and loosely measures the acoustic consequences of changing from an articulation of one feature type to another. In a manner similar to the significance values, the transformation penalties were determined by an expert. Tables IV–IX illustrate the preferred transformation penalties for the feature values except the feature values for the "realization" feature type.

TABLE IV (Feature Type = Height)

| from/to | high | semi-high | upper-mid | mid | low |
|---|---|---|---|---|---|
| high | 0.0 | 0.2 | 0.3 | 0.4 | 0.6 |
| semi-high | 0.2 | 0.0 | 0.2 | 0.3 | 0.5 |
| upper-mid | 0.3 | 0.2 | 0.0 | 0.2 | 0.4 |
| mid | 0.4 | 0.3 | 0.2 | 0.0 | 0.3 |
| low | 0.6 | 0.5 | 0.4 | 0.3 | 0.0 |

TABLE V (Feature Type = Place)

| from/to | bila | l-d | dent | alve | p-a | pala | vela | l-v | l-p | uvul | phar | glot |
|---|---|---|---|---|---|---|---|---|---|---|---|---|
| bila | 0.0 | 0.05 | 0.1 | 0.3 | 0.35 | 0.25 | 0.2 | 0.15 | 0.2 | 0.55 | 0.7 | 0.8 |
| l-d | 0.05 | 0.0 | 0.1 | 0.25 | 0.3 | 0.35 | 0.2 | 0.3 | 0.25 | 0.5 | 0.7 | 0.8 |
| dent | 0.1 | 0.1 | 0.0 | 0.05 | 0.1 | 0.15 | 0.25 | 0.3 | 0.35 | 0.45 | 0.6 | 0.7 |
| alve | 0.3 | 0.2 | 0.05 | 0.0 | 0.05 | 0.15 | 0.25 | 0.3 | 0.35 | 0.4 | 0.5 | 0.6 |
| p-a | 0.35 | 0.3 | 0.1 | 0.05 | 0.0 | 0.05 | 0.15 | 0.2 | 0.1 | 0.35 | 0.4 | 0.45 |
| pala | 0.25 | 0.35 | 0.15 | 0.15 | 0.05 | 0.0 | 0.05 | 0.15 | 0.1 | 0.3 | 0.4 | 0.45 |
| vela | 0.2 | 0.2 | 0.25 | 0.25 | 0.15 | 0.05 | 0.0 | 0.05 | 0.1 | 0.2 | 0.4 | 0.45 |
| l-v | 0.15 | 0.25 | 0.3 | 0.2 | 0.2 | 0.15 | 0.05 | 0.0 | 0.05 | 0.3 | 0.45 | 0.5 |
| l-p | 0.2 | 0.25 | 0.35 | 0.1 | 0.0 | 0.05 | 0.1 | 0.05 | 0.0 | 0.35 | 0.45 | 0.5 |
| uvul | 0.55 | 0.5 | 0.45 | 0.4 | 0.35 | 0.3 | 0.2 | 0.25 | 0.3 | 0.0 | 0.3 | 0.4 |
| pbar | 0.7 | 0.7 | 0.6 | 0.5 | 0.4 | 0.4 | 0.4 | 0.45 | 0.45 | 0.3 | 0.0 | 0.15 |
| glot | 0.8 | 0.8 | 0.7 | 0.6 | 0.45 | 0.45 | 0.45 | 0.5 | 0.5 | 0.4 | 0.15 | 0.0 |

(Key: bila = bilabial; l-d = labio-dental; dent = dental; alve = alveolar; p-a = palato-alveolar; pala = palatal; vela = velar; l-v = labio-velar; l-p = labio-palatal; uvul = uvular; phar = pharyngeal; glot = glottal).

TABLE VI (Feature Type = Roundness)

| from/to | rounded | unrounded |
|---|---|---|
| rounded | 0.00 | 1.0 |
| unrounded | 1.0 | 0.0 |

TABLE VII (Feature Type = Frontness)

| from/to | front | center | back |
|---|---|---|---|
| front | 0.0 | 0.2 | 0.4 |
| center | 0.2 | 0.0 | 0.2 |
| back | 0.4 | 0.2 | 0.0 |

TABLE VIII (Feature Type = Manner)

| from/to | stop | fric | nas | appr | vow | lat | tril | flap | clic | ejec | impl | affr |
|---|---|---|---|---|---|---|---|---|---|---|---|---|
| stop | 0.0 | 0.3 | 0.4 | 0.8 | 0.9 | 0.7 | 0.6 | 0.5 | 0.7 | 0.5 | 0.5 | 0.2 |
| fric | 0.3 | 0.0 | 0.3 | 0.6 | 0.8 | 0.6 | 0.5 | 0.35 | 0.8 | 0.6 | 0.6 | 0.15 |
| nas | 0.4 | 0.4 | 0.0 | 0.3 | 0.6 | 0.2 | 0.4 | 0.3 | 0.8 | 0.6 | 0.6 | 0.35 |
| appr | 0.8 | 0.4 | 0.3 | 0.0 | 0.2 | 0.2 | 0.4 | 0.25 | 0.8 | 0.8 | 0.8 | 0.7 |
| vow | 0.9 | 0.8 | 0.6 | 0.2 | 0.0 | 0.6 | 0.7 | 0.7 | 0.9 | 0.9 | 0.9 | 0.85 |
| lat | 0.7 | 0.6 | 0.2 | 0.2 | 0.3 | 0.0 | 0.35 | 0.3 | 0.8 | 0.8 | 0.8 | 0.7 |
| tril | 0.6 | 0.5 | 0.4 | 0.4 | 0.7 | 0.35 | 0.0 | 0.2 | 0.8 | 0.8 | 0.8 | 0.4 |
| flap | 0.5 | 0.35 | 0.3 | 0.25 | 0.7 | 0.3 | 0.2 | 0.0 | 0.8 | 0.8 | 0.8 | 0.4 |
| clic | 0.7 | 0.8 | 0.8 | 0.8 | 0.9 | 0.8 | 0.8 | 0.8 | 0.0 | 0.4 | 0.5 | 0.7 |
| ejec | 0.5 | 0.6 | 0.6 | 0.9 | 0.9 | 0.8 | 0.8 | 0.8 | 0.4 | 0.0 | 0.5 | 0.3 |
| impl | 0.5 | 0.6 | 0.6 | 0.9 | 0.9 | 0.8 | 0.8 | 0.8 | 0.5 | 0.5 | 0.0 | 0.4 |
| affr | 0.2 | 0.15 | 0.35 | 0.7 | 0.85 | 0.7 | 0.4 | 0.4 | 0.7 | 0.3 | 0.4 | 0.0 |

(Key: stop = stop consonant; fric = fricative; nas = nasal consonant; appr = approximant; vow = vowel; lat = lateral; tril = trill; flap = flap; clic = click; ejec = ejective; impl = implosive; affr = affricate)

TABLE IX

| from/to | (Feature Type = Voicing) voiced | voiceless |
|---|---|---|
| voiced | 0.0 | 1.0 |
| voiceless | 1.0 | 0.0 |

The "realization" feature type is preferably a sequence of binary features. The particular binary values for the sequence are zero when a "realization" feature value is transformed into the identical feature and one when the "realization" feature value is transformed into a second feature value. In more precise terms, let x be one of the realization attributes X, where X is the set {aspirated, unexploded, syllabic, murmured, long, velarized, labialized, palatalized, rhoticized, pharyngealized, tense}. If x changes from x to not-x (e.g., from aspirated to unexploded), the transformation penalty is one, while if x does not change (e.g., the feature value of both phonemes is aspirated), the transformation penalty is zero.

Using equation (3) and tables II–IX, the phonemic transformation weights can be calculated for any phoneme symbol pair (/x/, /y/). Additionally, insertion and deletion costs, W(/x/, "") and W("", /y/), respectively, are determined by using an expert to estimate the phonemic transformation weights of each phoneme and the null value. As an example transformation weight calculation, consider the phoneme symbol pair (/b/) {voiced bilabial stop}, and /d/ {palato-alveolar}. Applying equation (3), and using the appropriate values from the tables, the feature weight for place is 0.7, and the transformation penalty from "bilabial" to "pal-alv" is 0.3, which leads to a phoneme transformation penalty of D(/b/,/d/)=0.21. Table X, below, lists additional exemplary phonemic transformation weight pairs calculated using phonological features.

TABLE X

| Phoneme Pair | Weight |
|---|---|
| /b/, /d/ | 0.21 |
| /b/, /g/ | 0.18 |
| /b/, /p/ | 0.3 |
| /b/, /n/ | 0.61 |
| /b/, /w/ | 0.84 |

Although the values assigned to the phonemes, as shown above in Tables IV–IX, are preferred, other values may also be used. Indeed, the number of phonemes used to describe a language, the feature types, and the feature values were all picked based on the best judgement of language experts, but are, of course, not the only possible representation of a language.

Computation of Confusability Weights Based on Acoustic Models

A second method usable with the present invention for calculating the phonemic transformation weights uses the relative entropy between an acoustic model, such as the Hidden Markov Model (HMM). Relative entropy is first found by aligning the states in the HMMs, and then considering the dominant pair of components of the Gaussian mixtures.

Using HMMs to acoustically model phonemes is known. Generally, in a HMM model, phonemes are assigned multiple states. Each state is represented by two probability distributions: the state probability distribution function and the transition probability distribution function. The state probability represents the probability that the state is occupying a certain value, and the transition probability represents the probability that the stochastic process—a derivation of the speech signal—will leave the state.

Consistent with the present invention, each phoneme in the HMM is assigned an equal number of states. The states of the phonemes are aligned in a one-to-one relationship.

The state probability is a mixture of multi-variate Gaussian probability distributions, and is given by $$P_{x(i)} = \sum_{i=1}^{N} \eta_i G(\mu_i, \Sigma_i) \quad (4)$$

where $G(\mu_i, \Sigma_i)$ is a multi-variate Gaussian distribution with mean, $\mu_i$, and covariance matrix, $\Sigma_i$, N is the number of distributions in the mixture, and $\eta_i$ is the mixture weight.

The distance between HMM state $x_i$ and state $y_i$ of phoneme /x/ and /y/, respectively, is defined to be the relative entropy between mixtures $P_{x(i)}$ and $P_{y(i)}$, denoted $H(x_i, y_i)$. Methods for calculating $H(x_i, y_i)$ are known. One such description is given in the conference report "State Clustering of HMMs with Continuous Mixture Densities," by P. Stubley and J. F. Crespo. IEEE Workshop on Automatic Speech Recognition, Snowbird, Colorado, 1995.

The phonemic transformation weight between phonemes x and y, in terms of $H(x_i, y_i)$, is:

$$W(/x/, /y/) = \sum_{i=1}^{n} v_i H(x_i, y_i) \quad (5)$$

Here, n is the number of HMM states used to model the phoneme (e.g., 3), and $v_i$ is a state weight, set heuristically, with the following guiding principle: because the steady state behavior of a phoneme is usually represented by the central states in the acoustic model, these states are usually assigned a higher weight. Conversely, the initial and final states are usually assigned a smaller weight. Table XI, below, lists exemplary confusability weight pairs calculated using equation (5). In the table, three HMM states were used and the weights, $v_i$, were set at {0.2, 0.6, 0.2}. Note that the specific value of the state weights $V_1$ are not restricted to the example weights given in this disclosure.

TABLE XI

| Phoneme Pair | Weight |
|---|---|
| /b/, /d/ | 0.18 |
| /b/, /g/ | 0.21 |
| /b/, /p/ | 0.25 |
| /b/, /n/ | 0.54 |
| /b/, /w/ | 0.56 |

Application of the Confusability Tool: Vocabulary Diagnostic Tool

Computer recognition of human speech is valuable in many applications requiring human/computer interaction. In designing such a speech recognition system, there is some flexibility in the selection of the lexicon the computer is trained to recognize. The confusability tool consistent with the present invention may be used to automatically find word pairings that tend to cause high confusability. The designer can then replace the relevant orthographies with alternate synonyms. In general, simplification of a lexicon by replacing confusable words with non-confusable synonyms can be useful in many different communication areas, such as simplification of a lexicon to facilitate understanding across a communication medium. Alternatively, the creation of a highly confusable lexicon may also be valuable, in, for example, creating a confusable test lexicon to rigorously test a speech recognizer.

Figure 4:
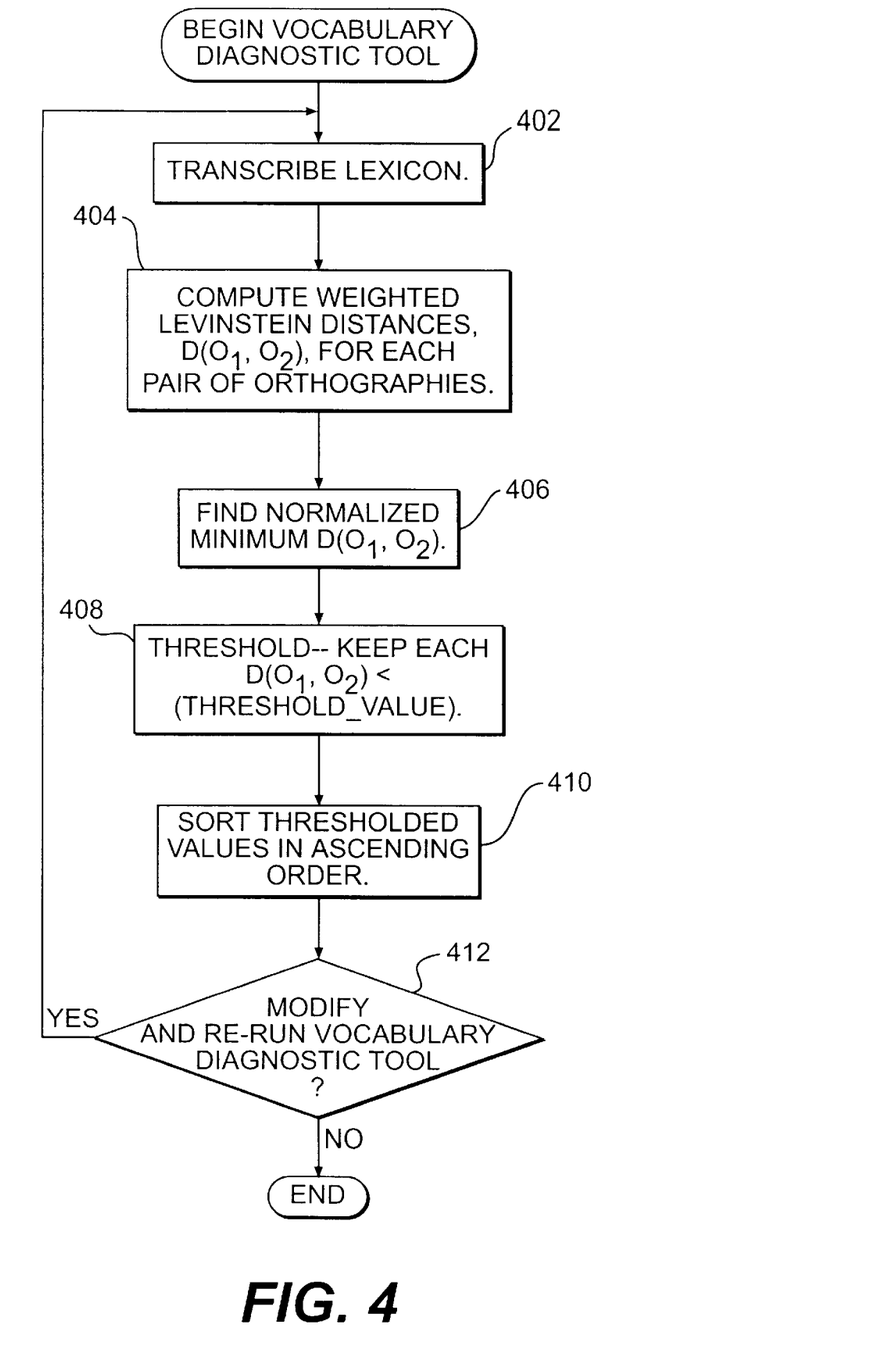
FIG. 4 is a flow chart illustrating the use of the present invention in a vocabulary diagnostic tool.

FIG. 4 is a flow chart illustrating the use of confusability tool 202 as a vocabulary diagnostic aide. The proposed lexicon of the speech recognizer is phonemically transcribed by a human expert or by an automated transcription tool (step 402) For each pair of orthographies, the weighted Levinstein distance is computed pursuant to equation (1) (step 404). Orthographies may have more than one transcription. For these, the minimum normalized weighted Levinstein distance is computed, pursuant to equation (2), to obtain $D(O_1, O_2)$ (step 406). The vocabulary diagnostic tool then apples a predefined threshold value to the normalized minimum values of each orthography pair, $D(O_1, O_2)$, of each triplet $\{O_1, O_2, D(O_1, O_2)\}$(step 408). Finally, the remaining triplets are sorted in ascending order by weight and presented to the designer (step 410).

Accordingly, the designer is automatically presented with a list of the orthographies in the proposed lexicon, sorted so that those orthographies most likely to be confused are presented first. Based on the list, the designer may modify the orthographies in the lexicon, and, if he desires, re-runs the vocabulary diagnostic tool (step 412).

A confusability tool for objectively and automatically generating confusability ratings between pairs of orthographies or phonemic transcriptions has been described. The confusability tool has many potential applications, including use in a vocabulary diagnostic tool and in a speech recognition algorithm. Other uses are possible. For example, the confusability tool can be used to help speakers acquire a second language by indicating word pairings that the speaker should spend extra time learning to pronounce because of their potential confusion, such as the words "tin" and "teen" for speakers whose first language does not differentiate between the sounds /i/ and /I/. As a second example, knowledge of potential confusable words could be used in the speech pathology field to help speakers differentiate or pronounce difficult word pairings.

It will be apparent to those skilled in the art that various modifications and variations can be made to the present invention without departing from the scope or spirit of the invention. For example, many-to-many phoneme transformations can be used instead of one-to-one transformations (e.g., $T_1$ and $T_2$ in $D(T_1, T_2)$ may include pairs such as /xy/ and /ab/, where /x/, /y/, /a/, and /b/ are all individual phonemes. Other possible modification include: (1) combining the weight and feature transformations using a non-linear combination; (2) the transformation weights may take into account bundles of features rather than a single feature at a time (e.g., mapping from {voiced stop} to {voiceless fricative} pairs rather than cumulating for {voiced} to {voiceless} and {stop} to {fricative}; (3) the table of 41×41 phoneme transformation penalties can be assigned heuristically by an expert; (4) and the table of 41×41 phoneme penalties can be assigned using results from a speech recognition experiment. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed:

1. A method of determining the likelihood of confusing a first word for a second word, comprising the steps of:

phonemically transcribing first and second orthographies of the first and second words into first and second phonemic transcriptions;

calculating a Levinstein distance between the first and second phonemic transcriptions, wherein the Levinstein distance corresponds to edit operations required to transform the first phonemic transcription into the second phonemic transcription;

obtaining a phonematic transformation weight for each edit operation of the Levinstein distance; and summing the obtained phonemic transformation weights to generate a value indicating the likelihood of confusion between the first and second words.

2. The method of claim 1, wherein the step of obtaining the phonemic transformation weights includes the substep of determining the phonemic transformation weight based on phonological features of phonemes used for edit operations.

3. The method of claim 2, wherein the substep of determining the phonemic weight comprises using the following equation:

$$\sum_{i=1}^{N} \alpha_i t(f_i(/x/), f_i(/y/))$$

where N represents the number of phonological feature types for each phoneme, $\alpha_i$ is the relative significance of feature type i, functions $f_i(/x/)$ and $f_i(/y/)$ represent feature value of the feature type i of phoneme /x/ and /y/, and $t(f(/x/), f(/y/))$ represents a transformation cost between feature values $f(/x/)$ and $f(/y/)$.

4. The method of claim 1, wherein the step of obtaining the phonemic transformation weights includes the substep of determining the phonemic transformation weight of a transformation between two phonemes based on Hidden Markov Models of the phonemes.

5. The method of claim 4, wherein the phonemic transformation weights obtained in the substep of determining the phonemic transformation weight of the transformation between two phonemes is calculated using the equation:

$$\sum_{i=1}^{N} v_i H(x_i, y_i)$$

where n represents the number of states used to model a phoneme, $v_i$ is a heuristically set weight for each said state used to model the phoneme, and $H(x_i, y_i)$ represents relative entropy between probability mixtures of a state I of phoneme x and a state I of phoneme y.

6. The method of claim 1, wherein the step of summing the obtained phonemic transformation weights further includes the step of normalizing the value indicating the likelihood of confusion between the first and second words.

7. The method of claim 1, wherein the step of calculating the Levinstein distance includes the substep of calculating multiple Levinstein distances between the first and second phonemic transcriptions.

8. The method of claim 1, further including the step of modifying a lexicon based on a generated value to minimize potential confusability between words in the lexicon.

9. The method of claim 1, further including the step of using a generated value as part of a speech recognition algorithm to translate a spoken word into a computer representation of the spoken word.

10. The method of claim 1, further including the step of using a generated values to build test lexicons to be used in evaluating speech recognition algorithms.

11. A computer readable medium containing instructions executable on a computer for determining the likelihood of confusing first and second phonemic transcriptions, the instructions causing the computer to:

calculate a Levinstein distance between the first and second phonemic transcriptions, wherein the Levinstein distance corresponds to edit operations required to transform the first phonemic transcription into the second phonemic transcription;

obtain a phonemic transformation weight for each edit operation of the Levinstein distance; and sum the obtained phonemic transformation weights to generate a value indicating the likelihood of confusion between the first and second phonemic transcriptions, that correspond to spoken words.

12. The computer readable medium of claim 11, further including instructions causing the computer to determine the phonemic transformation weight for each edit operation of the Levinstein distance based on phonological features of phonemes used for the first and second phonemic transcription.

13. The computer readable medium of claim 12, further including instructions causing the computer to determine the phonemic transformation weight as:

$$\sum_{i=1}^{N} \alpha_i t(f_i(/x/), \; f_i(/y/))$$

where N represents the number of phonological feature types for each phoneme, $\alpha_i$ is the relative significance of feature type i, functions $f_i(/x/)$ and $f_i(/y/)$ represent feature value of the feature type i of phoneme /x/ and /y/, and $t(f(/x/), f(/y/))$ represents a transformation cost between feature values $f(/x/)$ and $f(/y/)$.

14. The computer readable medium of claim 11, further including instructions causing the computer to determine the phonemic transformation weight between two phonemes based on Hidden Markov Models of the phonemes.

15. The computer readable medium of claim 14, further including instructions causing the computer to determine the phonemic transformation weight based on the equation:

$$\sum_{i=1}^{n} v_i H(x_i, y_i)$$

where n represents the number of states used to model a phoneme, $v_i$ is a heuristically set weight for each said state used to model the phoneme, and $H(x_i, y_i)$ represents relative entropy between probability mixtures of a state i of phoneme x and a state i of phoneme y.

16. The computer readable medium of claim 11, further including instructions for causing the computer to normalize the value indicating the likelihood of confusion between a first word and a second word.

17. The computer readable medium of claim 11, further including instructions causing the computer to calculate multiple Levinstein distances between the first and second phonemic transcriptions.

18. A computer system containing a process comprising:

a memory that stores a confusability tool program and a transcripted phonemic lexicon, the confusability tool program including means for calculating a Levinstein distance between first and second phonemic transcriptions from the lexicon, wherein the Levinstein distance corresponds to edit operations required to transform the first transcription, obtaining a phonemic transformation weight for each edit operation of the Levinstein distance, and summing the obtained phonemic transformation weights to generate a value indicating the likelihood of confusion between the first and second phonemic transcriptions;

a processor configured to execute the confusability tool program in the memory; and a display that provides an ordered list of entries, each entry including the first and second transcriptions and a cost based on the value indicating the likelihood of confusion between the first and second phonemic transcriptions.

19. The computer system of claim 18, further including means for calculating cost by normalizing the minimum weighted Levinstein distance of multiple possible Levinstein distances between the first and second phonemic transcriptions.

20. The computer system of claim 18, further including means for obtaining the phonemic transformation weight based on phonological features of the first and second phonemic transcriptions.

21. The computer system of claim 18, further including means for obtaining the phonemic transformation weight based on relative entropy probability mixtures between states of Hidden Markov Models of phonemes of the first and second phonemic transcriptions.

22. A method of detecting potentially confusable orthography pairs in a lexicon, comprising the steps of:

phonemically transcribing the orthographies in the lexicon;

computing a cost for each pair of orthographies in the lexicon equal to the minimum normalized weighted Levinstein distance for the orthography pair;

comparing the cost to a threshold value and discarding the orthography pairs corresponding to cost values greater than the threshold;

sorting the thresholded values in ascending order; and modifying the orthographies in the lexicon based on the sorted thresholded values.

* * * * *